United States Patent [19]

Nagashiro et al.

[11] 4,229,312
[45] Oct. 21, 1980

[54] METHOD OF MANUFACTURING A PAINT COMPOSITE FOR MAGNETIC FILMS

[75] Inventors: Waichi Nagashiro, Hachioji; Hajime Fukke, Inagi; Yoshiki Kato; Teruo Tsunoda, both of Tokyo; Teruaki Kobayashi, Hachioji; Yoichi Oba, Hachioji; Katsuyoshi Chiba, Hachioji; Munehisa Mitsuya, Hachioji; Heigo Ishihara, Kokubunji; Mitsushi Endo, Hadano, all of Japan

[73] Assignee: Hitachi, Ltd., Japan

[21] Appl. No.: 66,234

[22] Filed: Aug. 13, 1979

[30] Foreign Application Priority Data

Aug. 11, 1978 [JP]  Japan ................................ 53-97212

[51] Int. Cl.$^2$ ............................................. H01F 10/02
[52] U.S. Cl. ................................................ 252/62.54
[58] Field of Search ........................ 252/62.54, 62.53

[56] References Cited

U.S. PATENT DOCUMENTS

| | | | |
|---|---|---|---|
| 3,198,657 | 8/1965 | Kimball et al. | 427/126 |
| 3,788,996 | 1/1974 | Thompson | 252/62.54 |
| 3,824,128 | 7/1974 | Akashi et al. | 252/62.54 |
| 4,038,375 | 9/1977 | Loewenberg et al. | 428/474 |

*Primary Examiner*—F. C. Edmundson
*Attorney, Agent, or Firm*—Craig & Antonelli

[57] ABSTRACT

A method of manufacturing a paint composite for magnetic films wherein a mixture consisting of a magnetic powder, a polymer such as polyvinylbutyral, and a solvent is ground under a shear stress of 10–400 kg/cm$^2$, and the ground mixture has a solvent, an epoxy resin and a phenol resin added thereto and is further ground. When a magnetic disk is produced using a paint which has been obtained by executing the first grinding under a shear stress of 10–400 kg/cm$^2$ with a kneader or the like, it is endowed with excellent electric characteristics and surface flatness.

13 Claims, 3 Drawing Figures

METHOD OF MANUFACTURING A PAINT COMPOSITE FOR MAGNETIC FILMS

BACKGROUND OF THE INVENTION

This invention relates to a method of manufacturing a paint composite for producing magnetic films of a magnetic disk, etc.

A magnetic disk has heretofore been produced by a method wherein a substrate is coated with a paint in which fine grains of a ferromagnetic substance are dispersed in a solution of a polymer binder, and the coating is subjected to further processes including curing, finishing, etc. Such a paint is disclosed in, for example, U.S. Pat. No. 3,198,657. In general, however, magnetic powder grains in a coating film flocculate at random and exist in the form of flocs having non-uniform sizes, so that a high recording density-disk is not fully satisfactory in electrical defects, surface roughness, etc.

By randomly dispersing the individual magnetic powder grains in the disk coating film, therefore, it is possible to obtain a magnetic disk which has electrical noise and defects lessened and which exhibits excellent electromagnetic characteristics and mechanical characteristics.

List of Prior Art (37 CFR 1.56(a))

The following reference is cited to show the state of the art:

U.S. Pat. No. 3,198,657

SUMMARY OF THE INVENTION

An objet of this invention is to provide a method of manufacturing a paint in which magnetic powder grains are dispersed individually and randomly.

Another object of this invention is to provide a method of manufacturing a paint which is excellent for producing a high recording density-disk.

These and other objects are accomplished by a method of manufacturing a paint composite for magnetic films which comprises a first step of milling a mixture under a shear stress of 10–400 kg/cm$^2$, the mixture consisting essentially of:

magnetic powder ($\gamma$-Fe$_2$O$_3$, Co-doped-$\gamma$-Fe$_2$O$_3$, co-epitaxial-$\gamma$-Fe$_2$O$_3$, CrO$_2$, metal and metal alloy powder etc); 100 parts by weight at least one polymer selected from the group consisting of polyvinylbutyral (hereinbelow, abbreviated to "PVB"), polyvinylformal (hereinbelow, abbreviated to "PVFM") and polyvinyl acetate (hereinbelow abbreviated to "PVAC"); 1.5–30 parts by weight ps and solvents; 20–60 parts by weight a second step of adding 40–290 parts by weight of a solvent to the mill base and milling it, and a third step of adding 10–70 parts by weight of an epoxy resin, 10–70 parts by weight of a phenol resin and 0–450 parts by weight of a solvent to the resultant mill base and milling it.

DETAILED DESCRIPTION OF THE PREFERRED EMBODIMENTS

Figure 1:
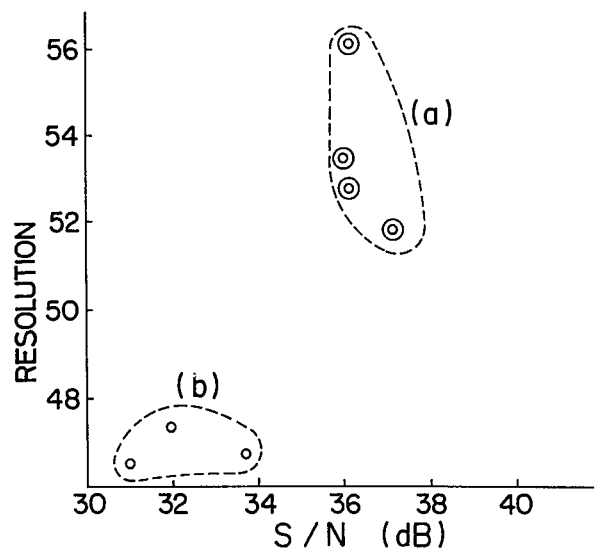
FIG. 1 is a diagram showing electric characteristics of magnetic disks.

This invention is characterized by manufacturing composite for magnetic films which consists essentially of:

magnetic powder; 100 parts by weight at least one polymer selected from the group consisting of PVB, PVFM and PVAC; 1.5–30 parts by weight epoxy resin; 10–70 parts by weight phenol resin; 10–70 parts by weight and solvent; 300–800 parts by weight and a paint composite for magnetic films which contains in addition to the above ingredients as may be needed:

filler; 0.1–15 parts by weight and/or polyurethane; 2–30 parts by weight.

In case of adding the filler, it is added in the first step of the manufacturing method. As the filler, all the known fillers for paints for magnetic films can be used. Especially, alumina is a favorable filler.

In case of adding the polyurethane, it is added in the third step of the method.

The grinding or milling in the first step is carried out with, for example, a kneader. Thus, a shear stress of 10–400 kg/cm$^2$ is to be exerted on the mixture. A more preferable range of shear stresses is 20–300 kg/cm$^2$. When the shear stress is less than 10 kg/cm$^2$, it is difficult to grind the mixture, and when it is at least 10 kg/cm$^2$ and is less than 20 kg/cm$^2$, a long time is taken, though the grinding is possible. When the shear stress exceeds 300 kg/cm$^2$, the resins tend to deteriorate due to mechanical effects, and when it exceeds 400 kg/cm$^2$, the deterioration becomes conspicuous. Accordingly, the specified range is of importance.

The shear stress is determined by the gap between the blade and container of the kneader, the rotational frequency, etc. Therefore, when the shear stress is calculated in advance, it can be adjusted by controlling the rotational frequency. More specifically, the shear stress $\tau$ is expressed by the following equation:

$$\tau = \eta \times \gamma$$

where $\eta$ denotes the viscosity of the solution, and $\gamma$ the shear rate. Further, $\gamma$ is expressed by the following equation:

$$\gamma = \frac{2\pi R (r/60)}{t}$$

where R denotes the radius of the blade of the kneader, r the rotational frequency (r.p.m.), and t the length of the gap between the blade and the container. Therefore, when the viscosities of the manufactured solutions have been measured in advance by a preliminary test, the mixture can be ground under a predetermined shear stress in the actual manufacture. The viscosity is measured by a rotational viscometer. As the mixture is ground, the viscosity etc. thereof vary, so that during the grinding the shear stress varies even when the rotational frequency is constant. If necessary, therefore, the rotational frequency is varied during the grinding so as to hold the shear stress within the specified range of values. By way of example, the mixture is ground for 30 minutes–24 hours while applying shear stresses of 10–400 kg/cm$^2$ by revolving the blade at rotational frequencies of 5–50 r.p.m. Meantime, the temperature of the mill base varies between the room temperature and approximately 95° C. The shear stress τ is also expressed by the following equation:

$$\tau = \frac{F}{A}$$

where F denotes a force which the blade receives, and A the area of a grinding portion of the kneader. A predetermined shear stress can, therefore, be given by measuring the force F with a torque meter and adjusting the rotational frequency as may be needed.

Regarding the mixture for use in the first step, it is unnecessary to mix all the starting materials simultaneously. It is acceptable to add the solvent after the polymer and the magnetic powder have been mixed in advance. The polymer may well be added after having been dissolved in the solvent.

The polymers of PVB, PVFM and PVAC should preferably have molecular weights of at least 20,000 and at most 2,000,000.

The grinding or millings in the second and third steps are carried out with, for example, an ordinary ball mill.

Also in this case, the remaining binder and solvent may be mixed either once or little by little in succession. The resin may well be dissolved in the solvent and then mixed.

The "quantity zero" of the solvent in the third step signifies that, when the solvent has already been added by 300 parts by weight or more, it need not be specially added in the third step. More preferably, however, 1 part by weight—450 parts by weight of the solvent is/are added.

The solvents for use in the first step, second step and third step need not be identical. Of course, they may be solvents of the same kind. As described above, the magnetic powder is milled along with the polymer such as PVB by means of a grinder such as kneader establishing the shear stress of 10–400 kg/cm², to cause the surfaces of the individual magnetic powder grains to adsorb the resin, whereupon the adjustments are made so as to obtain the final paint. The paint composite thus manufactured has a good stability of dispersion because the magnetic powder flocculates little owing to the effect (protective action) of the adsorbed polymer on the magnetic powder surfaces. Since the magnetic powder grains disperse individually and randomly, also magnetic powder grains in a coating film formed by a coating process disperse individually at random.

A magnetic disk can be produced from the magnetic paint composite obtained in this way, by a conventional method. That is, the magnetic disk is produced in such a way that, if necessary, the paint composite is further diluted with a solvent in order to establish a viscosity suitable for coating, that an aluminum substrate is coated with the paint composite, and that after executing alignment if necessary, the coating is cured and finished.

Figure 2A:
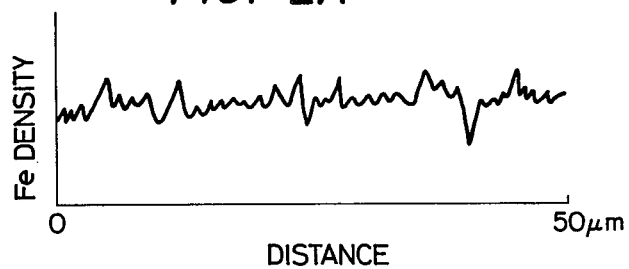
FIGS. 2A and 2B are diagrams showing the states of distributions of magnetic powder in the magnetic disks.
Figure 2B:
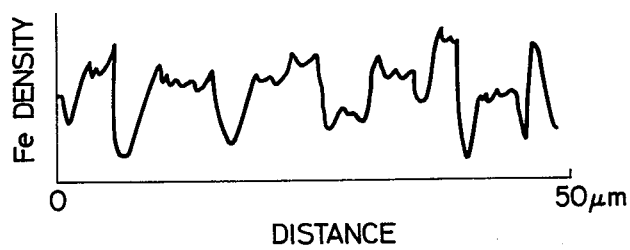

A disk manufactured by way of trial by the above method of production was much superior in various characteristics to a disk manufactured using a prior-art paint. FIG. 1 shows the measured results of electric characteristics of the disk of this invention (a) and the disk of the prior art (b). As seen from the figure, the disk of this invention (a) is enhanced approximately 5 dB in the S/N (signal-to-noise) ratio and approximately 5% in the resolving power over the prior-art disk (b). The reason is that since the individual magnetic powder grains in the coating film are distributed randomly and uniformly, the output is increased whereas noise is reduced. The states of distributions of the magnetic powder grains in the coating films were observed with an XMA (X-ray microanalyzer). The results are shown in FIGS. 2A and 2B, from which it is understood that the state of distribution in the disk of this invention in FIG. 2A is far more uniform than in the prior-art disk in FIG. 2B.

The roughness ($R_a$) of a coating surface in the disk of this invention is $R_a = 0.03$–$0.05$. These values are much smaller and better than $R_a = 0.02$–$0.03$ being the roughness of a finished surface in the prior-art disk. The disk of this invention can accordingly be used in the unfinished state, which leads to simplification of the process for producing the magnetic disk.

The following examples further illustrate the invention.

EXAMPLE 1

70 grams of powder of polyvinylbutyral and 700 grams of magnetic powder were thrown into a kneader in which the clearance between a blade and a container wall was 0.2 cm, and the powders were mixed for about 15 minutes. Subsequently, 250 grams of cyclohexanone was gradually added, and a grinding by the kneader was carried out under an initial shear stress of approximately 60 kg/cm² based on a revolving speed of 30 r.p.m. for about four hours. Meantime, although the conditions of the kneader grinding were held constant, the shear stress rose to approximately 160 kg/cm² and became a value of approximately 100 kg/cm² finally because of variations in the viscosity etc. of the mixure. 480 grams of the resultant mill base was taken and put into a ball milling pot having a capacity of 3 liters, and 700 grams of cyclohesanone was further added thereto. A ball milling was carried out for seven days so as to disperse the magnetic powder. Thereafter, 120 grams of a phenol resin, 300 grams of a cyclohexanone solution containing 40% of an epoxy resin, 500 grams of isophorone, and 170 grams of dioxane were added to the dispersion, to prepare a paint for a magnetic disk. The paint was subsequently applied into a coating film thickness of 1.0–1.5 μm on an aluminum substrate whose surface had been cleaned in advance, and the coating film was cured at 220° C. for four hours. The roughness of the disk surface immediately after the cure was $R_a = 0.04$ μm, which was much better than in a prior-art disk ($R_a = 0.10$–$0.15$ μm). The surface of the disk was further lapped into a layer thickness of 1.0 μm and a roughness $R_a = 0.02$ μm. The magnetic disk produced in this way was further immersed for five minutes in a freon solution containing 10% of perfluoroalkyl polyethers, whereupon it was pulled up in five minutes. The disk produced by the process thus far described had its electric characteristics measured. It was consequently found that, as compared with the prior-art disk, the disk of this invention was enhanced approximately 10% in noise and approximately 20% in the S/N (signal-to-noise) ratio. This was because the individual magnetic powder grains in the coating film dispersed randomly and uniformly.

When the surface of the coating film of the disk was observed with an SEM (scanning electron microscope), it was found that the packing density of the magnetic powder was enhanced and that protrusions in the surface were lessened.

EXAMPLES 2 to 6

In accordance with the same method described in Example 1, paint composites were manufactured by grinding mixtures of compositions listed in Table 1 under the same conditions as in Example 1 and then supplying the ground mixtures with a solvent in amounts listed in Table 2, followed by composites listed in Table 3. Also in this case, the shear stress in the first step was held in the range of 20-300 kg/cm². Using the paints, magnetic disks were produced in the same way as in Example 1. All the disks exhibited substantially the same excellent effects as described previously. Alumina was added as a filler, and it is effective to increase the strengths of coating films. Numerical values in the tables signify "parts by weight".

TABLE 1

| Example No. | 2 | 3 | 4 | 5 | 6 |
|---|---|---|---|---|---|
| magnetic powder | 100 | 100 | 100 | 100 | 100 |
| alumina | 0.1 | 15 | 15 | 15 | 15 |
| PVB | 1.5 | — | — | 20 | 20 |
| PVFM | — | 30 | — | — | — |
| PVAC | — | — | 30 | — | — |
| solvent | 20 | 60 | 60 | 60 | 60 |

TABLE 2

| Example No. | 2 | 3 | 4 | 5 | 6 |
|---|---|---|---|---|---|
| solvent | 80 | 240 | 240 | 290 | 290 |

TABLE 3

| Example No. | 2 | 3 | 4 | 5 | 6 |
|---|---|---|---|---|---|
| epoxy resin | 10 | 70 | 70 | 70 | 70 |
| phenol resin | 10 | 70 | 70 | 70 | 70 |
| polyurethane resin | — | — | — | — | 30 |
| solvent | 200 | 500 | 500 | 450 | 450 |

What is claimed is:

1. A method of manufacturing a paint composite for magnetic films which comprises a first step of grinding a mixture under a shear stress of 10–400 kg/cm², the mixture comprising 100 parts by weight of a magnetic powder, 1.5–30 parts by weight of at least one polymer selected from the group consisting of polyvinylbutyral polyvinylformal and polyvinyl acetate, and 20–60 parts by weight of a solvent for the polymer, a second step of adding 40–290 parts by weight of a solvent for the polymer to the ground mixture and then grinding the mixture, and a third step of adding 10–70 parts by weight of an epoxy resin, 10–70 parts by weight of a phenol resin and 0–450 parts by weight of a solvent for the polymer to the resultant mixture and further grinding the resultant mixture.

2. A method of manufacturing a paint composite for magnetic films as defined in claim 1, wherein said shear stress of 10–400 kg/cm² is exerted by the use of a kneader.

3. A method of manufacturing a paint composite for magnetic film as defined in claim 1, wherein said shear stress has a value of 20–300 kg/cm².

4. A method of manufacturing a paint composite for magnetic films as defined in claim 3, wherein said shear stress of 20–300 kg/cm² is exerted by the use of a kneader.

5. A method of manufacturing a paint composite for magnetic films as defined in claim 1, wherein 2–30 parts by weight of polyurethane are further added in the grinding of said third step.

6. A method of manufacturing a paint composite for magnetic films as defined in any of claims 1, 2, 3, 4 or 5 wherein said polymer is polyvinylbutyral.

7. A method of manufacturing a paint composite for magnetic films which comprises a first step of grinding a mixture under a shear stress of 10–400 kg/cm², the mixture consisting essentially of 100 parts by weight of a magnetic powder, 1.5–30 parts by weight of at least one polymer selected from the group consisting of polyvinylbutyral, polyvinylformal and polyvinyl acetate, 0.1–15 parts by weight of a filler, and 20–60 parts by weight of a solvent, the second step of adding 40–290 parts by weight of a solvent for said at least one polymer to the ground mixture and then grinding the resultant mixture, and a third step of adding 10–70 parts by weight of an epoxy resin, 10–70 parts by weight of a phenol resin and 0–450 parts by weight of a solvent for said polymer to the resultant mixture and further grinding the mixture.

8. A method of manufacturing a paint composite for magnetic films as defined in claim 7, wherein said shear stress of 10–400 kg/cm² is exerted by the use of a kneader.

9. A method of manufacturing a paint composite for magnetic films as defined in claim 7, wherein said shear stress has a value of 20–300 kg/cm².

10. A method of manufacturing a paint composite for magnetic films as defined in claim 9, wherein said shear stress of 20–300 kg/cm² is exerted by the use of a kneader.

11. A method of manufacturing a paint composite for magnetic films as defined in claim 7, wherein 2–30 parts by weight of polyurethane are further added in the grinding of said third step.

12. A method of manufacturing a paint composite for magnetic films as defined in claim 7, wherein said polymer is polyvinylbutyral.

13. A method of manufacturing a paint composite for magnetic films as defined in any of claims 7, 8, 9, 10 or 11, wherein said filler is alumina.

* * * * *